(12) United States Patent
Cai et al.

(10) Patent No.: US 11,455,581 B2
(45) Date of Patent: Sep. 27, 2022

(54) METHODS AND SYSTEMS FOR PROVIDING A USER INTERFACE FOR MANAGING PARTS PRODUCTION AND DELIVERY STATUSES

(71) Applicant: Palantir Technologies Inc., Denver, CO (US)

(72) Inventors: Allen Cai, Menlo Park, CA (US); Alexander Galimberti, London (GB); Jakub Pilch, London (GB); Lukas Czypulovski, Munich (DE); William Rhyne, Menlo Park, CA (US); Mihai Condur, London (GB); Tim Zimmermann, Berlin (DE)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/131,355

(22) Filed: Dec. 22, 2020

(65) Prior Publication Data

US 2021/0117879 A1    Apr. 22, 2021

Related U.S. Application Data

(63) Continuation of application No. 16/035,401, filed on Jul. 13, 2018, now Pat. No. 10,878,350.
(Continued)

(51) Int. Cl.
*G06Q 10/06* (2012.01)
*G06F 3/0484* (2022.01)
(Continued)

(52) U.S. Cl.
CPC ....... *G06Q 10/0631* (2013.01); *G06F 3/0482* (2013.01); *G06F 3/0484* (2013.01); *G06Q 10/0833* (2013.01)

(58) Field of Classification Search
CPC ............ G06Q 10/00–50/00; G06F 1/00–40/00
(Continued)

(56) References Cited

U.S. PATENT DOCUMENTS 5,809,479 A * 9/1998 Martin .................. G06Q 10/08
705/28
6,148,291 A * 11/2000 Radican ............... G06Q 10/087
705/28
(Continued)

OTHER PUBLICATIONS

"Database connection". Nov. 16, 2016 snapshot via Archive.org. URL Link: https://en.wikipedia.org/wiki/Database_connection. Accessed Jul. 2018.
(Continued)

*Primary Examiner* — Alan S Miller
(74) *Attorney, Agent, or Firm* — Sheppard Mullin Richter & Hampton LLP

(57) ABSTRACT

Methods and systems for providing a user interface to be displayed for management of parts production and delivery statuses and delivery statuses are provided. A method includes causing a user interface to be displayed on a computing system. The user interface includes a status list including one or more entries. Each entry corresponds to a parts unit and references one or more parts unit identifying datasets. Each entry indicates a production status including one or more sub-production statuses and a dispatching status, and a delivery status including a requested delivery time window and a forecasted delivery time for the parts unit. Each of the one or more sub-production statuses indicates at least one of a status of a sub-parts of the parts unit and a status of a sub-process to produce the parts unit.

20 Claims, 5 Drawing Sheets

Related U.S. Application Data

(60) Provisional application No. 62/683,172, filed on Jun. 11, 2018.

(51) Int. Cl.
*G06F 3/0482* (2013.01)
*G06Q 10/08* (2012.01)

(58) Field of Classification Search
USPC .............................................. 705/7.11–7.42
See application file for complete search history.

(56) References Cited

U.S. PATENT DOCUMENTS

| | | | |
|---|---|---|---|
| 6,856,968 B2* | 2/2005 | Cooley | G06Q 10/0875 |
| | | | 705/28 |
| 6,898,476 B2 | 5/2005 | Watanabe et al. | |
| 6,944,622 B1* | 9/2005 | Mitchell | G06Q 10/103 |
| | | | 707/999.102 |
| 7,729,886 B2* | 6/2010 | Sherrill | G06F 3/048 |
| | | | 702/183 |
| 8,321,806 B2* | 11/2012 | Agrusa | G05B 23/0267 |
| | | | 700/17 |
| 9,110,560 B1* | 8/2015 | Senesac | G06F 3/0481 |
| 9,128,995 B1* | 9/2015 | Fletcher | G06F 3/04817 |
| 2002/0010519 A1 | 1/2002 | Watanabe | G05B 15/02 |
| | | | 705/28 |
| 2002/0042756 A1* | 4/2002 | Kumar | G06Q 30/06 |
| | | | 705/7.31 |
| 2002/0065749 A1* | 5/2002 | Ikeda | G06Q 10/0875 |
| | | | 705/28 |
| 2002/0069096 A1* | 6/2002 | Lindoerfer | G06Q 10/06375 |
| | | | 705/7.41 |
| 2002/0082958 A1* | 6/2002 | Cooley | G06Q 10/0875 |
| | | | 705/29 |
| 2002/0087227 A1* | 7/2002 | Tozawa | G06Q 10/087 |
| | | | 705/28 |
| 2002/0087381 A1* | 7/2002 | Freeman | G06Q 10/06311 |
| | | | 705/7.13 |
| 2002/0101431 A1* | 8/2002 | Forney | G06F 16/954 |
| | | | 345/582 |
| 2002/0147654 A1* | 10/2002 | Kraisser | G06Q 10/08 |
| | | | 705/330 |
| 2003/0033179 A1* | 2/2003 | Katz | G06Q 10/0631 |
| | | | 705/7.41 |
| 2003/0093340 A1* | 5/2003 | Krystek | G06Q 10/0875 |
| | | | 705/28 |
| 2004/0122709 A1* | 6/2004 | Avinash | G16H 40/67 |
| | | | 706/45 |
| 2007/0118231 A1* | 5/2007 | Puik | G05B 23/0291 |
| | | | 700/44 |
| 2009/0154778 A1* | 6/2009 | Lei | G06K 9/6247 |
| | | | 382/112 |
| 2010/0057622 A1 | 3/2010 | Faith et al. | |
| 2010/0082455 A1* | 4/2010 | Rosenblatt | G06Q 30/0601 |
| | | | 705/26.1 |
| 2010/0250322 A1* | 9/2010 | Norwood | G06Q 10/06311 |
| | | | 715/764 |
| 2011/0022435 A1 | 1/2011 | Reid et al. | |
| 2011/0040596 A1* | 2/2011 | Chen | G06Q 50/04 |
| | | | 705/28 |
| 2011/0087632 A1* | 4/2011 | Subramanian | G06F 16/273 |
| | | | 707/610 |
| 2012/0095935 A1* | 4/2012 | Mowat | G06Q 10/08 |
| | | | 705/333 |
| 2013/0325763 A1* | 12/2013 | Cantor | G06Q 10/06312 |
| | | | 706/12 |
| 2014/0257552 A1* | 9/2014 | Senesac | G05B 19/41805 |
| | | | 700/182 |
| 2014/0282409 A1* | 9/2014 | Nassar | G06F 11/3688 |
| | | | 717/124 |
| 2015/0063627 A1* | 3/2015 | Mohammad | G06V 10/751 |
| | | | 382/103 |
| 2015/0095196 A1* | 4/2015 | Burks | G06F 16/5838 |
| | | | 705/26.63 |
| 2016/0217399 A1* | 7/2016 | Roelofs | G06Q 10/063116 |
| 2017/0004438 A1* | 1/2017 | Park | G06Q 10/063118 |

OTHER PUBLICATIONS

"HTML5 Drag and Drop". Dec. 2, 2016 snapshot via Archive.org. URL Link: https://www.w3schools.com/html/html5_draganddrop.asp. Accessed Jul. 2018.

Official Communication for U.S. Appl. No. 15/402,064 dated Apr. 26, 2017.

Official Communication for U.S. Appl. No. 15/402,064 dated Jul. 11, 2017.

Official Communication for U.S. Appl. No. 15/402,064 dated Jul. 19, 2018.

* cited by examiner

METHODS AND SYSTEMS FOR PROVIDING A USER INTERFACE FOR MANAGING PARTS PRODUCTION AND DELIVERY STATUSES

CROSS REFERENCE TO RELATED APPLICATIONS

This application is a continuation of U.S. application Ser. No. 16/035,401, filed Jul. 13, 2018, which claims the benefit under 35 U.S.C. § 119(e) of U.S. Provisional Application No. 62/683,172, filed Jun. 11, 2018, the content of each of which is incorporated by reference in its entirety into the present disclosure.

FIELD OF THE INVENTION

This disclosure relates to approaches for providing a user interface for management of parts production and delivery statuses.

BACKGROUND

Under conventional approaches, production and delivery statuses of parts to be assembled into a final article are managed based on individual communications between parts suppliers and a parts assembler through conventional communication methods such as emails, facsimile, telephone, and so on. Those conventional approaches may be inefficient to manage the production and delivery statuses of the parts because human agents typically have to go through each of the communications and determine the production and delivery statuses therefrom.

SUMMARY

Various embodiments of the present disclosure can include methods, systems, and non-transitory computer readable media for providing a user interface for management of parts production and delivery statuses, and the user interface. In some embodiments, a method includes causing a user interface to be displayed on a computing system. The user interface includes a status list including one or more entries, and each entry corresponds to a parts unit and references one or more parts unit identifying datasets to identify the parts unit. Each entry provides a production status including one or more sub-production statuses and a dispatching status, and a delivery status including a requested delivery time window and a forecasted delivery time for the parts unit. Each of the one or more sub-production statuses indicates at least one of a status of a sub-parts of the parts unit and a status of a sub-process to produce the parts unit.

In some embodiments, the one or more parts unit identifying datasets include an identifier of the parts unit, and one or more of i) an identifier of an end article for which the parts unit is used; ii) an identifier of a section of the end article at which the parts unit is used; and iii) an identifier of a production line to which the parts unit is to be delivered.

In some embodiments, each of the one or more sub-production statuses is indicated by an object having a color unique to the status. In some embodiments, the delivery status includes a first timeline indicating the requested delivery time window and a second timeline indicating the forecasted delivery time, the second timeline being displayed along with the first timeline.

In some embodiments, the method further includes filtering the status list to selectively display or display with emphasis one or more entries corresponding one or more parts units missing the forecasted delivery time. In some embodiments, the method further includes filtering the status list to selectively display or display with emphasis one or more entries corresponding one or more parts units that have not been delivered within the requested delivery time window. In some embodiments, the method further includes filtering the status list to selectively display or display with emphasis an entry corresponding to a target parts unit and one or more entries corresponding to one or more parts units having identical or replaceable features to the target parts unit. In some embodiments, the method further includes causing a screen indicating logs of setting the requested delivery time window and the forecasted delivery time to be displayed, with respect to a selected parts unit.

In some embodiments, the requested delivery time window is configurable selectively by users associated with the parts assembler, and not by users associated with a parts supplier of the corresponding parts unit. In some embodiments, the one or more sub-production statuses and a dispatching status are configurable selectively by users associated with a parts supplier of the corresponding parts unit, and not by users associated with the parts assembler.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
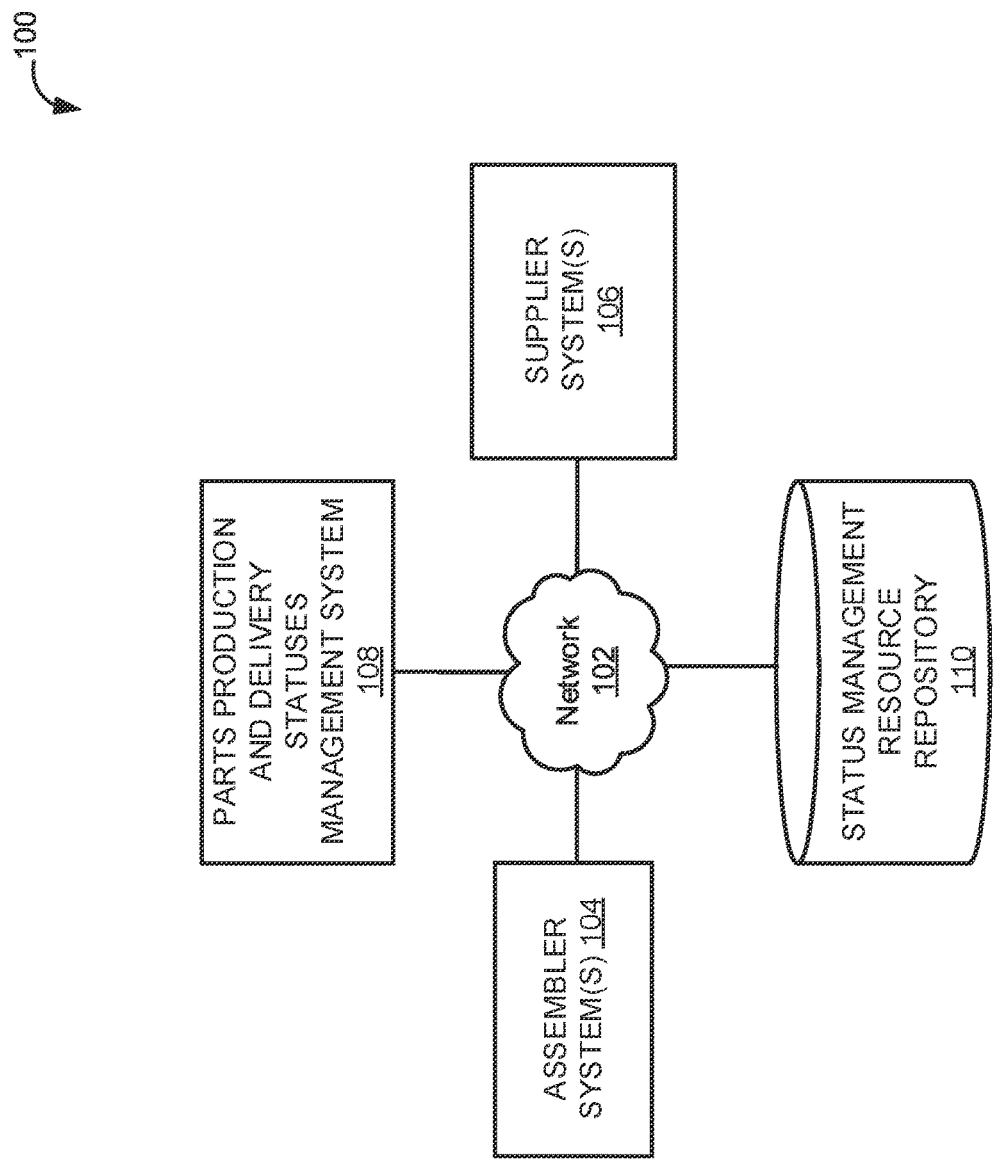
FIG. 1 illustrates an example of a parts production and delivery statuses management system for managing parts production and delivery statuses according to some embodiments.

A claimed solution rooted in computer technology overcomes problems specifically arising in the realm of computer technology. In various implementations, a computing system is configured to cause a graphical user interface (GUI) for presenting parts production and delivery statuses to be displayed. The GUI may be shared between one or more parts suppliers and a parts assembler, such that both can recognize and manage the parts production and delivery statuses primarily through the GUI. The GUI includes a status list including one or more entries, and each entry of the status list corresponds to a parts unit. For example, a parts unit can be a mechanical and/or electrical part to be assembled into a final mechanical and/or electrical article. Further, an entry of the status list can reference one or more parts unit identifying datasets that can be used to identify the parts unit. For example, a parts unit identifying dataset can include an identifier referencing a parts unit, an identifier referencing an end article for which the parts unit is used, an identifier referencing a section of the end article at which the parts unit is used, and an identifier of a production line to which the parts unit is to be delivered. Moreover, the entry of the status list can indicate a production status of the corresponding parts unit. For example, the production status can include one or more sub-production statuses and a dispatching status. More specifically, a sub-production status may indicate at least one of a status of a sub-parts of the parts unit and a status of a sub-process to produce the parts unit. In some embodiments, each sub-production status can be represented within the GUI using an object having a color that uniquely reflects a corresponding status. Furthermore, the entry of the status list can indicate a delivery status including a requested delivery time window and a forecasted delivery time. According to the GUI, the parts production and delivery statuses can be shared and managed in a centralized manner, without primarily relying on conventional communication methods such as mail, email, telephone, and so on.

In some embodiments, the delivery status is represented within the GUI using a first timeline (e.g., a sequence of blocks) indicating the requested delivery time window and a second timeline (e.g., a sequence of blocks) indicating the forecasted delivery time. The second timeline may be displayed along with (e.g., parallel to) the first timeline. In some embodiments, the status list is filterable to selectively display or display with emphasis one or more entries corresponding one or more parts units missing the forecasted delivery time. In some embodiments, the status list is filterable to selectively display or display with emphasis one or more entries corresponding one or more parts units that have not been delivered within the requested delivery time window. In some embodiments, the status list is filterable to selectively display or display with emphasis an entry corresponding to a target parts unit and one or more entries corresponding to one or more parts units having features that are identical or replaceable to the target parts unit.

FIG. 1 illustrates an example of an architecture of a system 100 for sharing and managing parts production and delivery statuses according to some embodiments. In the example shown in FIG. 1, the system 100 includes one or more assembler systems 104, one or more supplier systems 106, a parts production and delivery statuses management system 108, and status management resource repository 110. The assembler systems 104, supplier systems 106, parts production and delivery statuses management system 108, and status management resource repository 110 are able to communicate and interact with one another over a network 102. The status management resource repository 110 is illustrated in FIG. 1 as separate from the assembler systems 104, the supplier systems 106, and the parts production and delivery statuses management system 108. In implementations, the status management resource repository 110 may be stored on one or more of the assembler systems 104, the supplier systems 106, and the parts production and delivery statuses management system 108, or at a remote location.

In the example of the system shown in FIG. 1, the network 102 represents a computer communication network to connect various applicable computer components including those illustrated in FIG. 1. In a specific implementation, the network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other figures, different numbers of entities than those depicted may be used. Furthermore, according to various implementations, the components described herein may be implemented in hardware and/or software that configure hardware.

In the example of the system shown in FIG. 1, the assembler system 104 represents a computer system configured to interact with the parts production and delivery statuses management system 108 to obtain data for presenting a user interface for managing parts production and delivery statuses and present the user interface to an assembler that assembles parts units delivered thereto to produce an end article. In some embodiments, an assembler may be a manufacturer and/or a builder, and the end article may be a heavy industry product such as a vehicle and airplane, a consumer product such as an electronic device and home appliances, or a construction structure.

Figure 5:
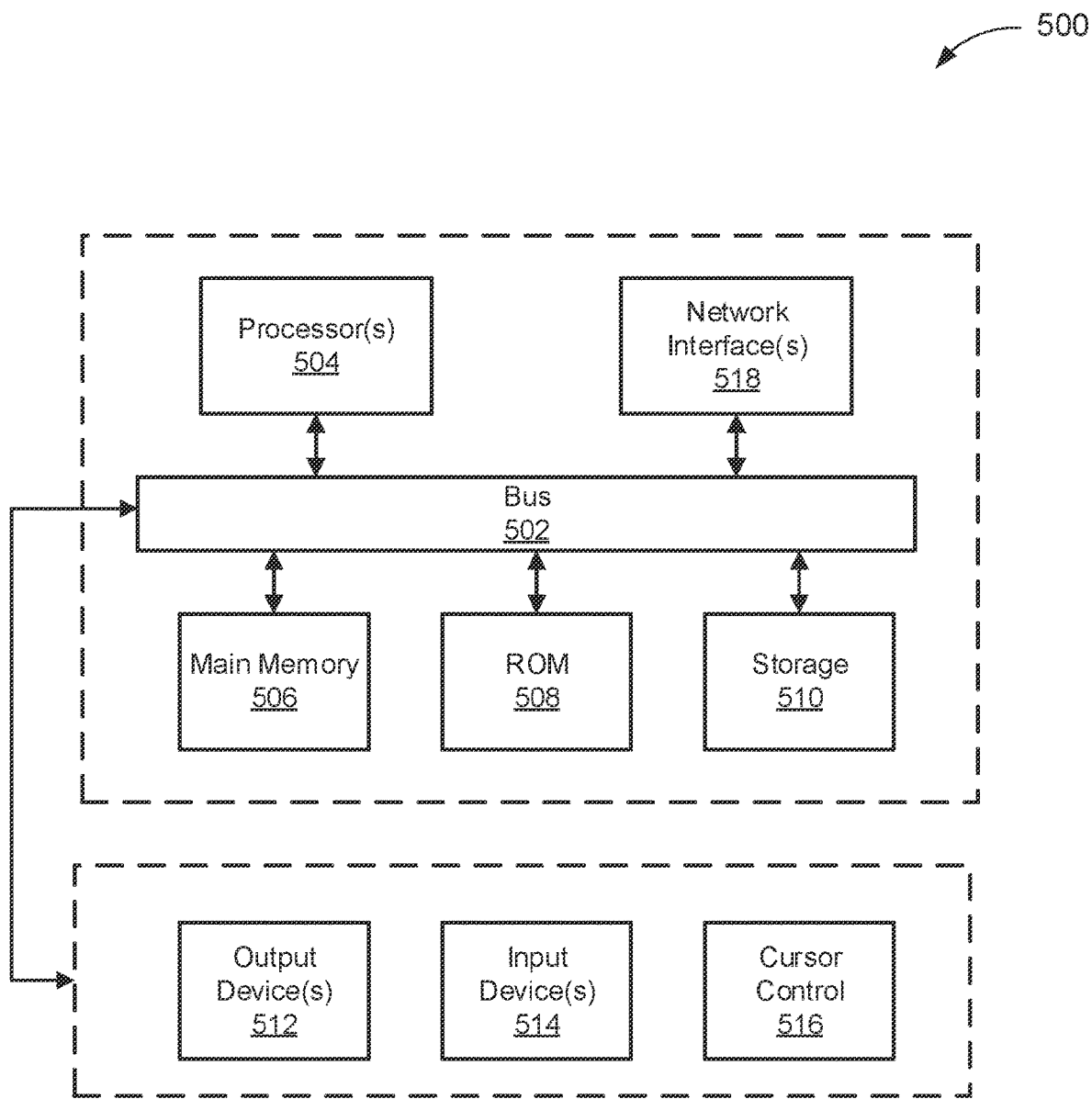
FIG. 5 is a block diagram that illustrates a computer system upon which any of the embodiments described herein may be implemented.

In some embodiments, one or more of the assembler system(s) 104 is configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to generate and/or receive and send datasets associated with the user interface for managing parts production and delivery statuses. In a specific implementation, one or more of the assembler system(s) 104 includes one or more processors, one or more storage devices, and/or other components. In some embodiments, the processors are programmed by one or more computer program instructions stored on a storage device. As used herein, for convenience, the various applicable instruction modules will be described as performing an operation, when, in fact, various applicable instructions program the processors (and therefore computer system) to perform the various applicable operations. Further details and features of a computer system configured for implementing features of the described invention may be understood with respect to computer system 500 as illustrated in FIG. 5.

In the example of the system shown in FIG. 1, the supplier system 106 represents a computer system configured to interact with the parts production and delivery statuses management system 108 to obtain data for presenting a user interface for managing parts production and delivery statuses and present the user interface to a supplier that supplies parts units to assemblers. In some embodiments, a supplier may be a manufacturer of a parts unit for an end article. For example, if the end article is a vehicle, the parts unit may include any applicable parts of the vehicle, such as a steering wheel, a windshield, a transmission, a battery, a seat, and so on. The structure of the supplier system 106 can be the same as or substantially similar to that of the assembler system 104. However, depending upon a specific implementation, the user interface provided to the supplier system 106 may be different from the user interface provided to the assembler system 104. Further, depending on the implementation, users of the assembler system 104 may have access to different privileges (or features) than users of the supplier system 106.

In the example of the system shown in FIG. 1, the parts production and delivery statuses management system 108 represents a hardware configured to set up a user interface for managing parts production and delivery statuses and enable the assembler system(s) 104 and the supplier system(s) 106 to present the user interface thereon. In some embodiments, the parts production and delivery statuses management system 108 provide programming instructions that cause the assembler system(s) 104 and/or the supplier system(s) 106 to generate respective user interfaces for managing parts production and delivery statuses based on the programming instructions. In some embodiments, a user interface presented by the assembler system(s) 104 and/or the supplier system(s) 106 includes a status list indicating a respective production status, dispatching status, and/or delivery status corresponding to various parts units. Details of user interfaces presented by the assembler system(s) 104 and/or the supplier system(s) 106 are discussed below with reference to FIGS. 2 and 3.

In the example of the system shown in FIG. 1, the status management resource repository 110 represents datastore configured to store status management resources. In some embodiments, the status management resources include datasets received from the assembler system(s) 104, datasets received from the supplier system(s) 106, and datasets generated by the parts production and delivery statuses management system 108. For example, datasets received from the assembler system(s) 104 may include datasets regarding details of an assembler such as identification, geographical location, contact information of the assembler, and details of an order of a parts unit such as identification, specification, requested delivery window, a preferred delivery time, a delivery destination, identification of a supplier of the parts unit, and so on. For example, datasets received from the supplier system(s) 106 may include datasets regarding details of a supplier such as identification, geographical location, contact information of the supplier, and details of a parts unit supply such as identification, dispatched time (if any), production progress, forecasted delivery time, a delivery destination, identification of an assembler of the parts unit, and so on. For example, datasets generated by the parts production and delivery statuses management system 108 may include logs of updates of datasets based on datasets received from the assembler system(s) 104 and/or the supplier system(s) 106, default setting values, and so on. More specifically, the logs of updates may include logs of updates to a production status, logs of updates to a dispatching status, logs of updates to a delivery status, logs of updates to a requested delivery window, and logs of updates to a preferred delivery time. For example, default setting values may include default sub-production statuses, such as default sub-processes of a parts unit, default sub-parts of a parts unit, a default delivery window, and so on.

In some embodiments, the status management resource repository 110 described herein may be configured in a database. The databases may comprise one or more such databases that reside in one or more physical devices and in one or more physical locations. The database may store a plurality of types of data and/or files and associated data or file descriptions, administrative information, or any other data.

In some embodiments, the database includes a referential table in which relationship among stored datasets are indicated separately from a status list. In a specific implementation, the referential table includes a plurality of entries, and each of the entries may correspond to a single parts unit, a single assembler, and/or a single supplier. Further, an entry of the referential table includes an identifier and metadata of datasets associated with the entry, and also include various relationships with other datasets. For example, in an entry, the various relationships includes identifiers of other datasets that matches a specific relationship type with respect to each of a plurality of relationship types.

In some embodiments, the status management resource repository 110 may comprise a storage device including one or more of random access memory (RAM), read only memory (ROM), and/or other memory. The storage device may store the computer program instructions (e.g., the aforementioned source codes) to be executed by a processor as well as datasets that may be manipulated by the processor. The storage device may comprise floppy disks, hard disks, optical disks, tapes, or other storage media for storing computer-executable instructions and/or data.

Although illustrated in FIG. 1 as a single component, the assembler system(s) 104, the supplier system(s) 106, and the status management resource repository 110 may each include a plurality of individual components (e.g., computer devices) each programmed with at least some of the functions described herein. In this manner, some components of the assembler system(s) 104, the supplier system(s) 106, and the status management resource repository 110 may perform some functions while other components may perform other functions, as would be appreciated. The various instructions described herein are exemplary only. Other configurations and numbers of instructions may be used, so long as the processor of the assembler system(s) 104, the supplier system(s) 106, and the status management resource repository 110 are programmed to perform the functions described herein.

Figure 2:
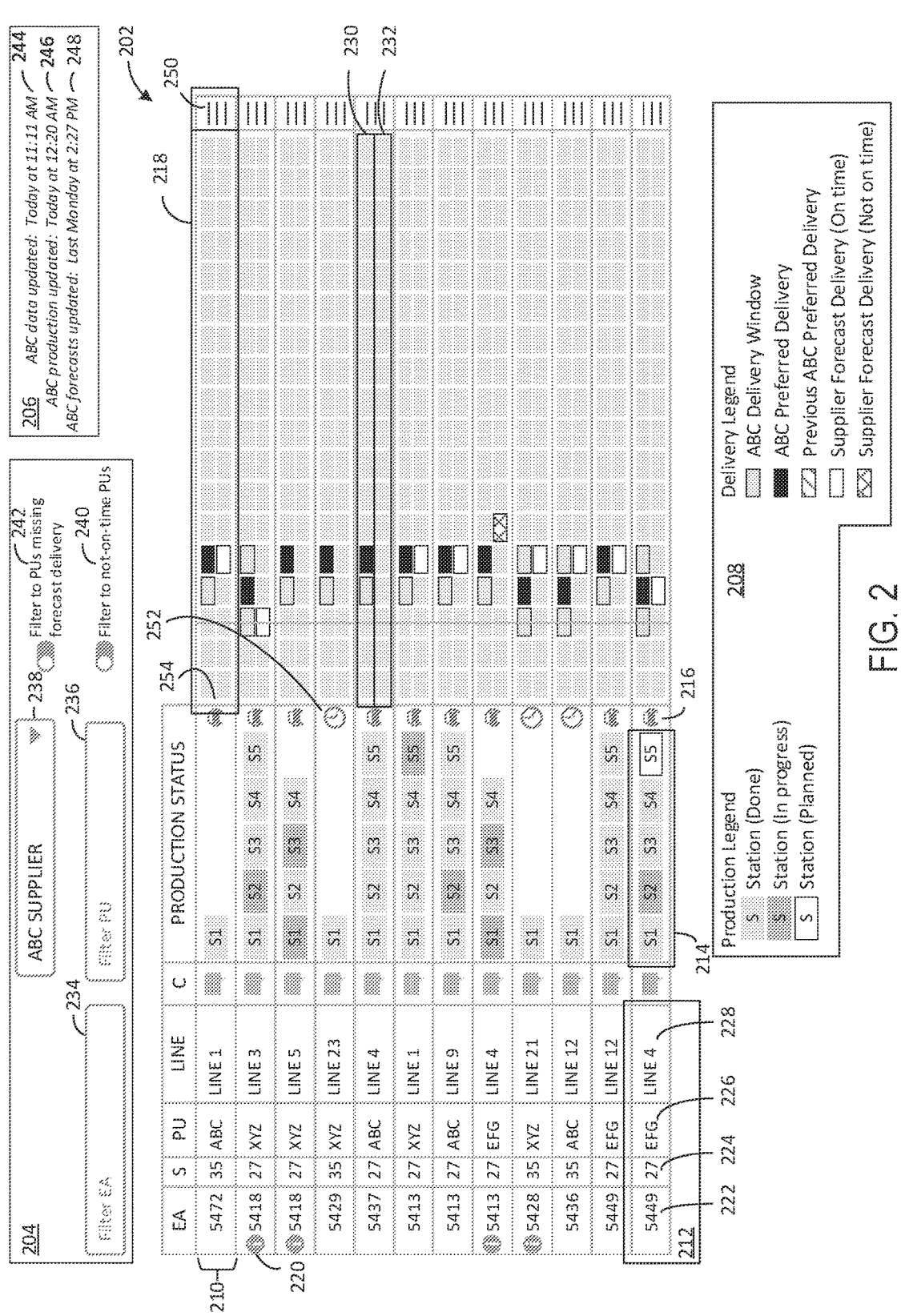
FIG. 2 illustrates an example of a user interface for presenting parts production and delivery statuses according to some embodiments.

FIG. 2 illustrates an example of a graphical user interface (GUI) 200 for managing parts production and delivery statuses according to some embodiments. In the example shown in FIG. 2, the GUI 200 represents a GUI generated and presented by an applicable system such as the assembler system(s) 104 and the supplier system(s) 106 in FIG. 1, through applicable programs, such as a web browser and/or a dedicated application program for presenting the GUI. In FIG. 2, the GUI 200 includes a status list 202, status list filtering tools 204, a status update indicator 206, and status list legend section 208. Specifically, the status list 202 includes one or more entries 210, and the status list 202 includes a parts unit identifier section 212, a production status section 214, a dispatching status section 216, a delivery status section 218, an extensive function section 220, and a reordering section 250.

In the example of FIG. 2, the status list 202 is intended to serve as a primary region of the GUI 200 for managing parts production and delivery statuses. The status list 202 can be manipulated based on user operations, including scrolling, object selection, tab expansion, text inputs, and so on. In the status list 202, each entry 210 corresponds to a parts unit to be produced and delivered.

In each entry 210, the parts unit identifier section 212 represents a section to indicate identification information and metadata of a parts unit. In the shown example, the parts unit identifier section 212 includes an end article identifier 222, a group identifier 224, a group part identifier 226, and a production line identifier 228. The end article identifier 222 indicates identification of an end article for which the corresponding parts unit is used. For example, the end article identifier 222 may identify a model and a specific vehicle identification number (e.g., VIN) of a vehicle, when the end article is a vehicle. The group identifier 224 indicates identification of a section of the end article in which the corresponding parts unit is used. For example, the group identifier 224 may identify a section of a vehicle (e.g., driver instrument panel section), when the end article is a vehicle. The group part identifier 226 indicates identification of the corresponding parts unit. For example, the group part identifier 226 may specify a type of a display monitor, when the corresponding parts unit is the display monitor. The production line identifier 228 indicates identification of a production line at which the corresponding parts unit is used for assembling. For example, the production line identifier 228 may identify a geographical region of a factory, a factory, and/or a production line in a factory. Depending on a specific implementation, the display order of the end article identifier 222, the group identifier 224, the group part identifier 226, and the production line identifier 228 may or may not be rearranged by users. Also, the entries 210 in the status list 202 may or may not be sorted based on one or more of the display order of the end article identifier 222, the group identifier 224, the group part identifier 226, and the production line identifier 228.

In each entry 210, the production status section 214 represents a section to indicate a production status of a corresponding parts unit. In the shown example, the production status section 214 includes one or more blocks, each of which may represent at least one of a production status of a sub-parts of the parts unit and a status of a sub-process to produce the parts unit. For example, when multiple sub-parts are required to produce a parts unit, each block of the production status section 214 may indicate a production status of a corresponding sub-part. For example, when multiple sub-processes are required to produce a parts unit, each block of the production status section 214 may indicate a status of a corresponding sub-process. In the shown example, each block indicates identification of the corresponding sub-part or sub-process therein and indicates different statuses by different colors. More particularly, a block of a first color (e.g., green) indicates that production of the corresponding sub-part and/or the corresponding sub-process have been completed. A block of a second color (e.g., blue) indicates that that production of the corresponding sub-part and/or the corresponding sub-process is in progress. A block of a third color (e.g., gray) indicates that that production of the corresponding sub-part and/or the corresponding sub-process is planned (has not been started). Depending on the implementation, the production status may be conveyed using means other than color. For example, only an outstanding block may be shown. In another example, the distinction of statuses may be shown using a specific mark corresponding to the status. Also, depending on a specific implementation, the order of multiple blocks of the production status section 214 may or may not correspond to the order in which sub-processes performed if those sub-processes are to be performed sequentially.

In each entry 210, the dispatching status section 216 can indicate a dispatching status of a corresponding parts unit. In the shown example, the dispatching status section 216 includes a mark that indicates different dispatching statuses by color. More particularly, a mark of a first color indicates that the parts unit has been dispatched, and a mark of a second color indicates that the parts unit has not been dispatched. Depending on a specific implementation, the manner of indicating the production status may not be limited by color, and other applicable approaches, such different types of objects may be used to convey such information. For example, a grayed clock mark (e.g., clock mark 252) may appear when a production is forecasted to end on a certain future date. The grayed clock mark may turn red when the forecasted production date exceeds a certain threshold (e.g., a deadline). A grayed car mark (e.g., car mark 254) may appear when a delivery (or dispatch) is planned for a certain future date. A green car mark may appear when a delivery (or dispatch) was actually made on a certain date. In some embodiments, more detailed information regarding production and/or dispatch may be presented, for example, by a pop-up, when a user locates (or hovers) a cursor (e.g., mouse pointer) over the mark. The detailed information may include a forecasted date of production, a forecasted date of dispatch, an actual date of production, an actual date of dispatch, and so on. Further, a pop-up may also include a link to more information regarding the production and/or dispatch status. In some embodiments, forecast of production may be calculated based on standard lead time (e.g., average lead time) of one or more parts units of identical configuration, which may be further calculated based on standard lead time (e.g., average lead time) of one or more subparts and/or sub-process to produce the one or more parts units.

In each entry 210, the delivery status section 218 may indicate a delivery status of a corresponding parts unit. In the shown example, the delivery status section 218 includes an assembler status region 230 and a supplier status region 232 arranged along the assembler status region 230. Each of the assembler status region 230 and the supplier status region 232 indicates a timeline and includes a plurality of blocks each of which corresponds to a unit time period (e.g., half-day, day, week, month, etc.), and a current time is indicated by an object (e.g., line) common among the plurality of entries 210. In the assembler status region 230, a requested delivery window and a preferred delivery time, which are set by an assembler, are indicated. More specifically, one or more blocks of the assembler status region 230 corresponding to the requested delivery window are shown by a color different from (e.g., more dense than) a color of blocks that are out of the requested delivery window. Further, one or more blocks of the assembler status region 230 corresponding to the preferred delivery time are shown by a color different from (e.g., more dense than) a color of the blocks corresponding to the requested delivery window. Depending on a specific implementation, when the requested delivery window and the preferred delivery time coincide, one or more blocks corresponding to the requested delivery window may overlap and may not be shown. In some embodiments, when the requested delivery window and/or the preferred delivery time have been changed, the previously-set requested delivery window and/or the previously-set preferred delivery time may be shown in a different manner from the current requested delivery window and/or the current preferred delivery time. In some embodiments, the assembler status region 230 is configurable selectively by users associated with the assembler, and not by users associated with the supplier of the corresponding parts unit, even though the same GUI (or information presented within the GUI) can be shared between the assembler and the supplier.

In the supplier status region 232, a forecasted delivery time, which can be set by a supplier, and/or an actual delivery time, which can be recorded by an assembler, are indicated. More specifically, a block of the supplier status region 232 corresponding to the forecasted delivery time is shown by a color different from (e.g., more dense than) a color of blocks that are not the forecasted delivery time, a block of the supplier status region 232 corresponding to the actual delivery time is shown by a color different from the color of the block corresponding to the forecasted delivery time and the color of blocks that are neither the forecasted delivery time nor the actual delivery time. Depending on a specific implementation, when the forecasted delivery time and the actual delivery time coincide, the block corresponding to the forecasted delivery time may be overlapped and may not be shown. In some embodiments, the block may be indicated differently depending on whether the forecasted delivery time is within the requested delivery window. In some embodiments, when the forecasted delivery time has changed, the previously-set forecasted delivery time may be shown in a different manner from the current forecasted delivery time. In some embodiments, the supplier status region 232 is configurable selectively by users associated with the supplier, and not by users associated with the assembler of the corresponding parts unit, even though the same GUI (or information presented within the GUI) can be shared between the assembler and the supplier.

In one or more of entries 210, the extensive function section 220 represents a section to navigate to one or more extensive functions associated with a corresponding parts unit. In some embodiments, the one or more extensive functions may include a function to show a log of update events associated with the corresponding parts unit. For example, the log may include a first log indicating update events occurred in the production status section 214, a second log indicating update events occurred in the dispatching status section 216, a third log indicating update events occurred in the delivery status section 218. With respect to the third log, update events by an assembler and update events by a supplier may be displayed together or separately. Details of a log will be described below with reference to FIG. 3.

In each entry 210, the reordering section 250 represents a section to navigate to one or more reordering functions associated with a corresponding parts unit. In some embodiments, the one or more reordering functions may include a function to selectively show or show with emphasis one or more entries corresponding to parts units that are replaceable with a target parts unit selected by a user, for example, by selecting the extensive function section 220 of the target parts unit. Parts unit of the same or similar specific specification as the target parts unit may have been delivered previously and not used yet for assembling. In such a case, by showing the replaceable parts units, the assembler can find an already-delivered replaceable parts unit and replace an undelivered target parts unit with the already-delivered replaceable parts unit.

In the example of FIG. 2, the status list filtering tools 204 include tools to filter the entries 210 of the status list 202. In the shown example, the status list filtering tools 204 includes a first filtering tool 234 to filter the entries 210 of the status list 202 based on an end article, a second filtering tool 236 to filter the entries 210 of the status list 202 based on a parts unit, a third filtering tool 238 to filter the entries 210 of the status list 202 based on a supplier, a fourth filtering tool 240 to filter the entries 210 of the status list 202 based on whether or not a forecasted delivery time is missing, and a fifth filtering tool 242 to filter the entries 210 of the status list 202 based on whether or not a delivery has been and/or is predicted to be performed within a requested delivery time window. Depending on a specific implementation, the manner of filtering the entries 210 using the status list filtering tools 204 may employ any applicable manners, text based, selection based, and so on.

In the example of FIG. 2, the status update indicator 206 represents one or more indicators to indicate the most recent update time of corresponding events. In the shown example, the status update indicator 206 includes a first status update indicator 244 to indicate a most recent update time of the production status sections 214 of the plurality of entries 210, a second status update indicator 246 to indicate a most recent update time of the assembler status regions 230 of the plurality of entries 210, and a third status update indicator 248 to indicate a most recent update time of the supplier status regions 232 of the plurality of entries 210.

In the example of FIG. 2, the status list legend section 208 represents a section to indicate legends of the status list 202. In the shown example, the status list legend section 208 includes legends corresponding to the production status sections 214 and legends corresponding to the delivery status section 218. The GUI 200 is provided as just one example of an interface for managing parts production and delivery statuses. Naturally, many variations are possible.

Figure 3:
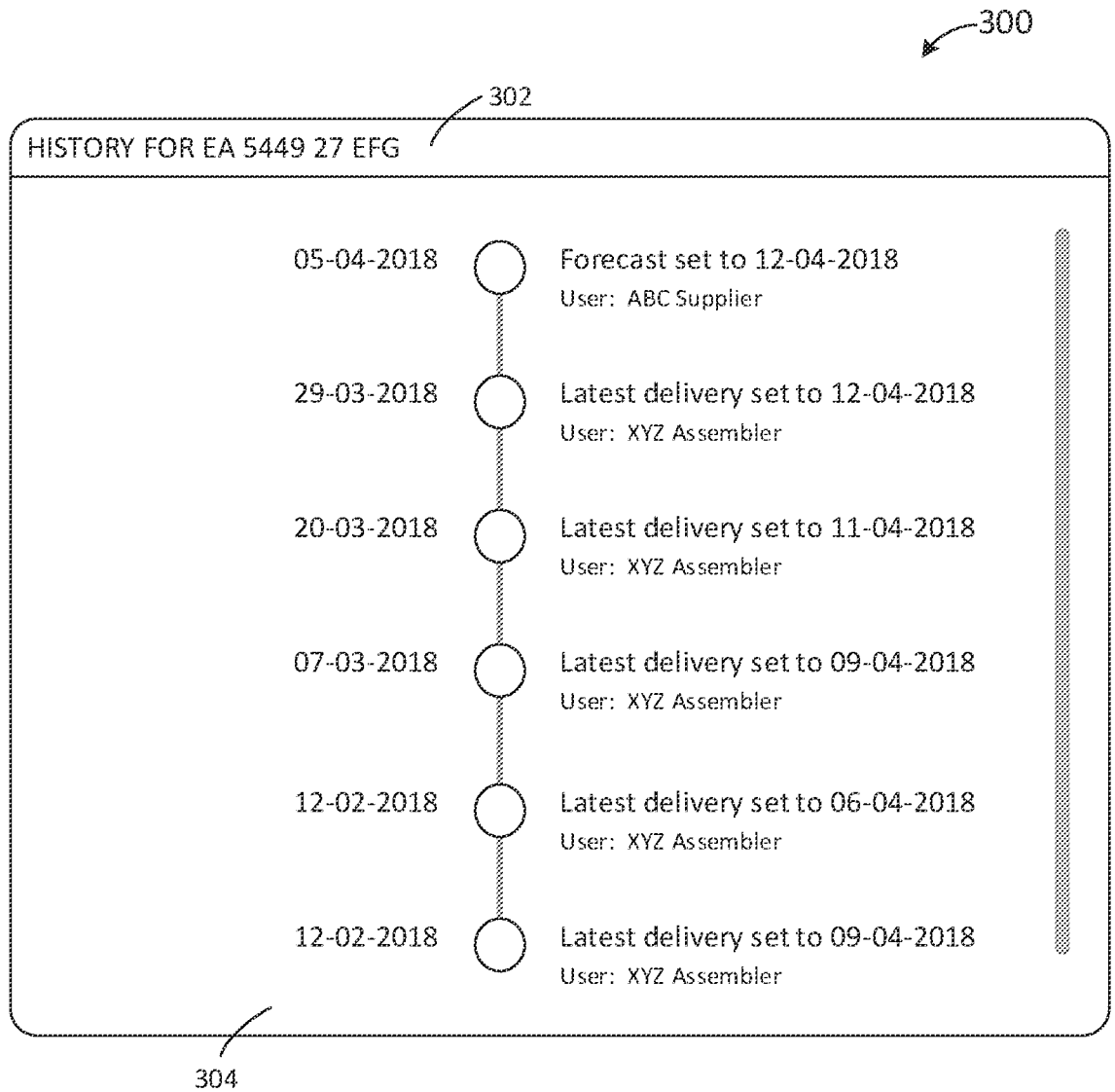
FIG. 3 illustrates an example of a user interface for presenting logs of setting the requested delivery time window and the forecasted delivery time with respect to a selected parts unit according to some embodiments.

FIG. 3 illustrates an example of a log GUI 300 for presenting logs of setting the requested delivery time window and the forecasted delivery time with respect to a selected parts unit according to some embodiments. In the example shown in FIG. 3, the log GUI 300 represents a GUI generated and presented based on user operation on a GUI including a status list such as the GUI 200 shown in FIG. 2. In FIG. 3, the log GUI 300 includes a title bar 302 and a log presenting region 304. The main log presenting region 304 includes a plurality of logs listed in a chronological order, and each of the logs correspond to an update event for the assembler status regions 230 or the supplier status regions 232. More particularly, a log may indicate an update of a requested delivery window or a preferred delivery time set by an assembler, or an update of a delivery forecast time set by a supplier. Depending on a specific implementation, updates by either the assembler or the supplier may be selectively presented. Also, depending on a specific implementation, the log GUI 300 may be presented on top of the GUI including the status list, independently from the GUI including the status list in a full screen, or in an expanded region of the GUI including the status list.

Figure 4:
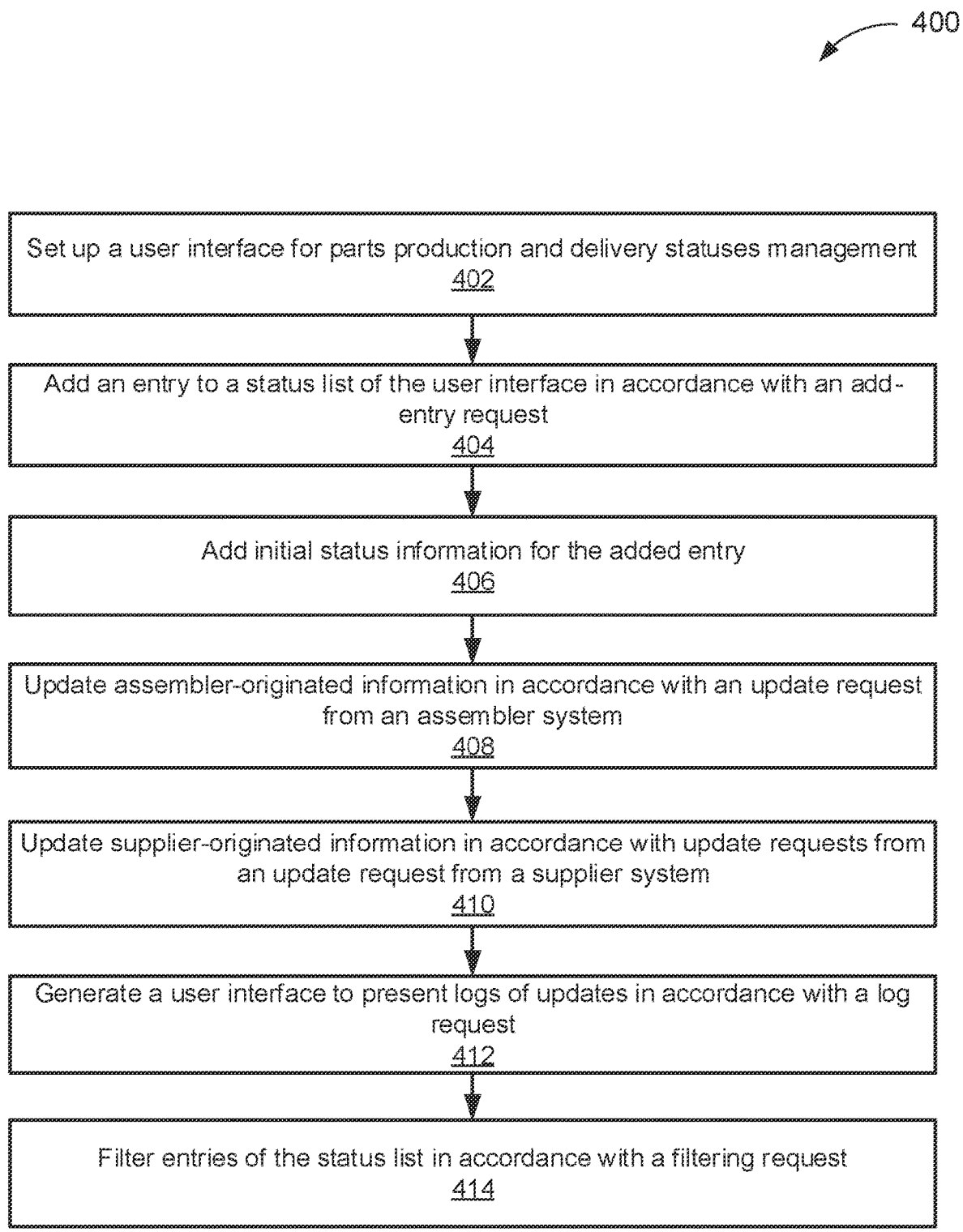
FIG. 4 is a flowchart of an example of a method for managing parts production and delivery statuses according to some embodiments.

FIG. 4 is a flowchart 400 of an example of a method for managing parts production and delivery statuses according to some embodiments. This flowchart described in this paper illustrate modules (and potentially decision points) organized in a fashion that is conducive to understanding. It should be recognized, however, that the modules can be reorganized for parallel execution, reordered, modified (changed, removed, or augmented), where circumstances permit. In some embodiments, the modules shown in the flowchart 400 are primarily carried out by an applicable system the parts production and delivery statuses management system 108 in FIG. 1.

In module 402 of FIG. 4, a user interface for parts production and delivery statuses management is set up. In some embodiments, data for presenting the setup user interface are provided to applicable systems such as the assembler system(s) 104 and the supplier system(s) 106 in FIG. 1, such that parts assembler(s) and parts supplier(s) can review a user interface and share information regarding parts production and delivery statuses.

In module 404 of FIG. 4, an entry is added to a status list of the user interface in accordance with an add-entry request. In some embodiments, the add-entry request is generated by applicable systems such as the assembler system(s) 104 and the supplier system(s) 106 in FIG. 1, such that a new parts unit to be produced by a supplier and delivered to an assembler is added to the status list. In some embodiments, the added entry includes one or more parts unit identifying datasets to identify the corresponding parts unit.

In module 406 of FIG. 4, initial status information is added for the added entry. In some embodiments, the initial status information includes initial production status information, initial dispatching status information, and initial delivery status information. For example, when a parts unit is to be produced according to a predetermined production procedure including a plurality of sub-production processes, the initial production status information includes one or more sub-production statuses, and the one or more sub-production statuses indicates that those sub-production processes have not been completed. For example, when a parts units is to be produced by assembling a plurality of sub-parts, the initial production status information includes one or more sub-production statuses, and the one or more sub-production statuses indicates that production of those sub-parts have not been completed. For example, when a parts unit has not been dispatched from a supplier site, the initial dispatching status information indicates that the parts unit has not been dispatched. For example, when no forecasted delivery time and a requested delivery time window has been set, the initial delivery status information includes no such information. In some embodiments, the initial status information may be set based on default data preset in association with a specific parts unit, or based on input data received from the assembler system(s) and/or the supplier system(s), along with or in association with the add-entry request.

In module 408 of FIG. 4, assembler-originated information is updated in accordance with an update request from an assembler system. In some embodiments, assembler-originated information includes, with respect to each of one or more entries, a requested delivery time window, which may include a start date (and time) and an end date (and time), and one or more most preferable delivery data (and time).

In module 410 of FIG. 4, supplier-originated information is updated in accordance with update requests from an update request from a supplier system. In some embodiments, supplier-originated information includes, with respect to each of one or more entries, changes to be made to a production status (or parts thereof, such as one or more sub-production statuses), a dispatching status, and/or a forecasted delivery time. In a specific implementation, as a result of the initial status information and updates of the assembler-originated information and the supplier-originated information, a user interface including the status list results in the one shown in FIG. 2.

In module 412 of FIG. 4, a user interface to present logs of updates is generated in accordance with a log request. In some embodiments, the log request is generated by applicable systems such as the assembler system(s) 104 and the supplier system(s) 106 in FIG. 1, such that the user interface including logs of updates, such as the one shown in FIG. 3, is presented. In some embodiments, the logs of updates includes update events (either assembler-originated updates and supplier-originated updates) that have occurred with respect to a specific entry corresponding to a specific parts unit in chronological order. In some embodiments, the logs of updates can selectively include update events of changing a requested delivery time window and update events of changing a forecasted delivery time for the parts unit.

In module 414 of FIG. 4, entries of the status list are filtered in accordance with a filtering request. In some embodiments, the filtering request is generated by applicable systems such as the assembler system(s) 104 and the supplier system(s) 106 in FIG. 1. In a specific implementation, the filtering request requests selective display or emphasized display of one or more entries corresponding one or more parts units missing the forecasted delivery time, such that the status list displays selectively or with emphasis the corresponding entries. In a specific implementation, the filtering request requests selective display or emphasized display of one or more entries corresponding one or more parts units that have not been delivered within the requested delivery time window, such that the status list displays selectively or with emphasis the corresponding entries. In a specific implementation, the filtering request requests selective display or emphasized display of an entry corresponding to a target parts unit and one or more entries corresponding to one or more parts units having identical or replaceable features to the target parts unit.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for generating and providing access to an interactive user interface for parts production and delivery management, the method comprising:
  storing, in a first database on a first computing device, supply information regarding parts units, the supply information comprising:
    respective identifications of the parts units, and
    any of:
      production statuses, or specifications of the parts units;
  storing, in a second database on a second computing device, assembly information regarding the parts units, the assembly information comprising:
    respective identifications of an article assembled from at least a subset of the parts units, and
    any of:
      one or more portions of the article in which the subset of the parts units is inserted, or
      respective identifications of a production line in which the article is assembled;
  inputting, separately from the supply information or the assembly information, into the first database or the second database, a referential table comprising relationships between respective particular entries of the supply information and the assembly information;
  obtaining, from the first database, the supply information;
  obtaining, from the second database, the assembly information;
  generating the interactive user interface using, at least in part, the supply information, the assembly information, and the referential table, wherein the generating of the interactive user interface comprises populating sections of the interactive user interface by juxtaposing the supply information with the assembly information according to the referential table; and
  providing each of a first user associated with the supply information and a second user associated with the assembly information with access to the interactive user interface,
  wherein the supply information is configurable by the first user but not the second user and the assembly information is configurable by the second user but not the first user.

2. The method of claim 1, wherein the assembly information for the parts unit comprises a forecasted delivery window for delivering the parts unit to the assembler and the supply information for the parts unit comprises a requested delivery window for the parts unit.

3. The method of claim 2, wherein the interactive user interface depicts the forecasted delivery window using first indicia if the forecasted delivery window is within the requested delivery window or depicts the forecasted delivery window using second indicia if the forecasted delivery window is outside of the requested delivery window, wherein the first indicia is visually distinct from the second indicia.

4. The method of claim 3, wherein the forecasted delivery window is a first forecasted delivery window, the method further comprising:
  receiving an indication from the supplier that the first forecasted delivery window has been updated to a second forecasted delivery window; and
  updating the interactive user interface to depict the second forecasted delivery window using a third indicia,
  wherein the first forecasted delivery window continues to be depicted in the interactive user interface using the first indicia, and
  wherein the third indicia is visually distinct from each of the first indicia and the second indicia.

5. The method of claim 1, further comprising:
  receiving, from a supplier system associated with the supplier, an update to the supplier-originated data;
  modifying the interactive user interface to include the updated supplier-originated data; and
  providing each of the first user and the second user with access to the modified interactive user interface.

6. The method of claim 1, further comprising:
  receiving, from an assembler system associated with the assembler, an update to the assembler-originated data;
  modifying the interactive user interface to include the updated assembler-originated data; and providing each of the first user and the second user with access to the modified interactive user interface.

7. The method of claim 1, wherein the interactive user interface is a first user interface, the method further comprising:
generating a second user interface comprising logs of updates to at least one of the supplier-originated data or the assembler-originated data; and
providing each of the first user and the second user with access to the second user interface.

8. The method of claim 1, wherein the first status information comprises production status information for the parts unit, the production status information including a plurality of blocks, wherein each block represents a production status of a respective sub-part of the parts unit or a production status for a respective sub-process for producing for producing the parts unit.

9. The method of claim 1, wherein each of a plurality of blocks is assigned a respective indicia within the interactive interface to indicate a corresponding production status.

10. The method of claim 1, wherein the interactive user interface comprises a filtering tool selectable by each of the first user and the second user to filter at least one of the supplier-originated data or the assembler-originated data based on one or more filtering criteria.

11. A system for generating and providing access to an interactive user interface for parts production and delivery management, the system comprising:
at least one memory storing computer-executable instructions; and
at least one processor configured to access the at least one memory and execute the computer-executable instructions to:
store, in a first database on a first computing device, supply information regarding parts units, the supply information comprising:
respective identifications of the parts units, and
any of:
production statuses, or specifications of the parts units;
store, in a second database on a second computing device, assembly information regarding the parts units, the assembly information comprising:
respective identifications of an article assembled from at least a subset of the parts units, and
any of:
one or more portions of the article in which the subset of the parts units is inserted, or
respective identifications of a production line in which the article is assembled;
input, separately from the supply information or the assembly information, into the first database or the second database, a referential table comprising relationships between respective particular entries of the supply information and the assembly information;
obtain, from the first database, the supply information;
obtain, from the second database, the assembly information;
generate the interactive user interface using, at least in part, the supply information, the assembly information, and the referential table, wherein the generating of the interactive user interface comprises populating sections of the interactive user interface by juxtaposing the supply information with the assembly information according to the referential table; and
provide each of a first user associated with the supply information and a second user associated with the assembly information with access to the interactive user interface,
wherein the supply information is configurable by the first user but not the second user and the assembly information is configurable by the second user but not the first user.

12. The system of claim 11, wherein the assembly information for the parts unit comprises a forecasted delivery window for delivering the parts unit to the assembler and the supply information for the parts unit comprises a requested delivery window for the parts unit.

13. The system of claim 12, wherein the interactive user interface depicts the forecasted delivery window using first indicia if the forecasted delivery window is within the requested delivery window or depicts the forecasted delivery window using second indicia if the forecasted delivery window is outside of the requested delivery window, wherein the first indicia is visually distinct from the second indicia.

14. The system of claim 13, wherein the forecasted delivery window is a first forecasted delivery window, and wherein the at least one processor is further configured to execute the computer-executable instructions to:
receive an indication from the supplier that the first forecasted delivery window has been updated to a second forecasted delivery window; and
update the interactive user interface to depict the second forecasted delivery window using a third indicia,
wherein the first forecasted delivery window continues to be depicted in the interactive user interface using the first indicia, and
wherein the third indicia is visually distinct from each of the first indicia and the second indicia.

15. The system of claim 11, wherein the at least one processor is further configured to execute the computer-executable instructions to:
receive, from a supplier system associated with the supplier, an update to the supplier-originated data;
modify the interactive user interface to include the updated supplier-originated data; and
provide each of the first user and the second user with access to the modified interactive user interface.

16. The system of claim 11, wherein the at least one processor is further configured to execute the computer-executable instructions to:
receive, from an assembler system associated with the assembler, an update to the assembler-originated data;
modify the interactive user interface to include the updated assembler-originated data; and
provide each of the first user and the second user with access to the modified interactive user interface.

17. The system of claim 11, wherein the interactive user interface is a first user interface, and wherein the at least one processor is further configured to execute the computer-executable instructions to:
generate a second user interface comprising logs of updates to at least one of the supplier-originated data or the assembler-originated data; and
provide each of the first user and the second user with access to the second user interface.

18. The system of claim 11, wherein the first status information comprises production status information for the parts unit, the production status information including a plurality of blocks, wherein each block represents a production status of a respective sub-part of the parts unit or a production status for a respective sub-process for producing for producing the parts unit.

19. The system of claim 11, wherein each of a plurality of blocks is assigned a respective indicia within the interactive interface to indicate a corresponding production status.

20. The system of claim 11, wherein the interactive user interface comprises a filtering tool selectable by each of the first user and the second user to filter at least one of the supplier-originated data or the assembler-originated data based on one or more filtering criteria.

* * * * *